US009475400B2

(12) United States Patent
Hooker et al.

(10) Patent No.: US 9,475,400 B2
(45) Date of Patent: Oct. 25, 2016

(54) CHARGING DEVICE AND METHODS FOR CONTROLLING A CHARGING DEVICE

(75) Inventors: John Kenneth Hooker, Louisville, KY (US); Shawn Alan Morgan, Goshen, KY (US); Ivan Rodriguez Marcano, Madrid (ES)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 346 days.

(21) Appl. No.: 13/992,525

(22) PCT Filed: Dec. 10, 2010

(86) PCT No.: PCT/ES2010/070815
§ 371 (c)(1),
(2), (4) Date: Aug. 19, 2013

(87) PCT Pub. No.: WO2012/076730
PCT Pub. Date: Jun. 14, 2012

(65) Prior Publication Data
US 2013/0320923 A1 Dec. 5, 2013

(51) Int. Cl.
*B60L 11/00* (2006.01)
*B60L 11/18* (2006.01)
(Continued)

(52) U.S. Cl.
CPC .......... *B60L 11/1824* (2013.01); *B60L 3/0046* (2013.01); *B60L 11/1809* (2013.01); *B60L 11/1812* (2013.01); *B60L 11/1816* (2013.01); *B60L 11/1838* (2013.01); *H02J 7/0026* (2013.01); *H02J 7/0029* (2013.01); *B60L 2230/12* (2013.01); *B60L 2240/36* (2013.01); *Y02T 10/7005* (2013.01);
(Continued)

(58) Field of Classification Search
None
See application file for complete search history.

(56) References Cited

U.S. PATENT DOCUMENTS 5,451,881 A * 9/1995 Finger ........................ 324/433
7,568,538 B2 * 8/2009 Drosendahl .............. B62K 9/00
180/65.1

(Continued)

FOREIGN PATENT DOCUMENTS

CN 101777754 A 7/2010
EP 1848087 10/2007
(Continued)

OTHER PUBLICATIONS

PCT Search Report and Written Opinion from corresponding PCT Application No. PCT/ES2010/070815, Dated Apr. 2, 2012.
(Continued)

*Primary Examiner* — Leigh Garbowski
(74) *Attorney, Agent, or Firm* — GE Global Patent Operation; Stephen G. Midgley

(57) ABSTRACT

A charging device for use with an electric vehicle including a power storage device. The charging device includes a power conduit configured to electrically couple the power storage device to the charging device. The charging device includes a first protection device configured to electrically isolate the charging device from the power storage device if a current flowing through the power conduit exceeds a current limit. The charging device also includes a controller configured to control the current flowing through the power conduit if the current flowing through the power conduit causes an integration threshold to be exceeded, wherein the integration threshold is representative of a predetermined amount of current that is enabled to flow through the power conduit over a predetermined period of time.

20 Claims, 4 Drawing Sheets

(51) Int. Cl.
*H02J 7/00* (2006.01)
*B60L 3/00* (2006.01)

(52) U.S. Cl.
CPC .......... *Y02T 10/7072* (2013.01); *Y02T 90/121* (2013.01); *Y02T 90/14* (2013.01)

(56) References Cited

U.S. PATENT DOCUMENTS

| | | | | |
|---|---|---|---|---|
| 8,098,044 | B2 * | 1/2012 | Taguchi | B60L 11/1816 320/109 |
| 8,405,939 | B2 * | 3/2013 | Haines et al. | 361/42 |
| 8,558,504 | B2 * | 10/2013 | Brown et al. | 320/109 |
| 8,666,572 | B2 * | 3/2014 | Mitsutani | B60K 1/02 701/22 |
| 8,736,101 | B2 * | 5/2014 | Masuda | B60L 11/005 307/10.1 |
| 2002/0057582 | A1 | 5/2002 | Nakayama | |
| 2007/0222412 | A1 | 9/2007 | Maloizel et al. | |
| 2009/0167537 | A1 | 7/2009 | Feliss | |
| 2009/0313033 | A1 | 12/2009 | Hafner et al. | |
| 2009/0313034 | A1 | 12/2009 | Ferro et al. | |
| 2009/0313103 | A1 | 12/2009 | Ambrosio et al. | |
| 2009/0313104 | A1 | 12/2009 | Hafner et al. | |
| 2010/0177451 | A1 | 7/2010 | Tang et al. | |
| 2010/0211643 | A1 | 8/2010 | Lowenthal | |
| 2010/0259242 | A1 | 10/2010 | Degner | |
| 2011/0095725 | A1 * | 4/2011 | Troxel et al. | 320/118 |
| 2011/0270476 | A1 * | 11/2011 | Doppler | B60L 11/1816 701/22 |
| 2012/0056585 | A1 * | 3/2012 | Mariels | 320/116 |
| 2012/0161717 | A1 * | 6/2012 | Li et al. | 320/145 |

FOREIGN PATENT DOCUMENTS

| | | |
|---|---|---|
| FR | 2728712 | 6/1996 |
| WO | 2010049775 | 5/2010 |
| WO | 2011127446 | 10/2011 |

OTHER PUBLICATIONS

Unofficial English Translation of Chinese Office Action and Search Report issued in connection with corresponding CN Application No. 201080070665.X on Dec. 3, 2014.

* cited by examiner

CHARGING DEVICE AND METHODS FOR CONTROLLING A CHARGING DEVICE

BACKGROUND OF THE INVENTION

The present application relates generally to charging devices and, more particularly, to a charging device and methods for controlling a charging device.

As electric vehicles and/or hybrid electric vehicles have gained popularity, an associated need to accurately manage delivery of electrical energy to such vehicles has increased. Moreover, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable. At least some known charging stations and/or electric vehicles are designed or rated to operate at a predefined current amplitude. However, one or more components within the charging station and/or within the electric vehicle may fail or exhibit abnormal behavior. Such failures and/or abnormal behavior may cause the current transmitted through the power cable to exceed the rated current of the charging station and/or the electric vehicle.

To protect components within the charging station and/or the electric vehicle from excessive current, at least some known charging stations include at least one protective device coupled to the power cable. If excessive current is transmitted through the power cable, the protective device electrically decouples the charging station from the electric vehicle. However, after such protective devices are activated, a maintenance technician may be required to visit the charging station to reset or replace the protective device and restore the charging capability of the station. Such visits may be costly and/or an undesirable amount of time may pass before a technician visit may be arranged.

BRIEF DESCRIPTION OF THE INVENTION

In one embodiment, a charging device for use with an electric vehicle including a power storage device is provided that includes a power conduit configured to electrically couple the power storage device to the charging device. The charging device includes a first protection device configured to electrically isolate the charging device from the power storage device if a current flowing through the power conduit exceeds a current limit. The charging device also includes a controller configured to control the current flowing through the power conduit if the current flowing through the power conduit causes an integration threshold to be exceeded, wherein the integration threshold is representative of a predetermined amount of current that is enabled to flow through the power conduit over a predetermined period of time.

In another embodiment, a charging device for use with an electric vehicle including a power storage device is provided that includes a power conduit configured to electrically couple the power storage device to the charging device. The charging device includes a first protection device configured to electrically isolate the charging device from the power storage device if a current flowing through the power conduit exceeds a current limit. The charging device also includes a controller configured to control the current flowing through the power conduit if a temperature within the charging device exceeds a predetermined threshold.

In yet another embodiment, a method of controlling a charging device is provided that includes supplying current to a power storage device of an electric vehicle using the charging device and measuring at least one of a temperature within the charging device and a current flowing through the charging device. The current supplied to the power storage device is adjusted based on at least one of the measured temperature and the measured current.

In a further embodiment, a system is provided for use in charging a power storage device of an electric vehicle using current received from an electric power source. The system includes a charging device including a power conduit configured to receive current from the electric power source and to provide the current to the power storage device, and a first protection device configured to electrically isolate the charging device from the power storage device if a current flowing through the power conduit exceeds a current limit. The system also includes a controller configured to control the current flowing through the power conduit based on at least one of a temperature within the charging device and the current flowing through the power conduit.

DETAILED DESCRIPTION OF THE INVENTION

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
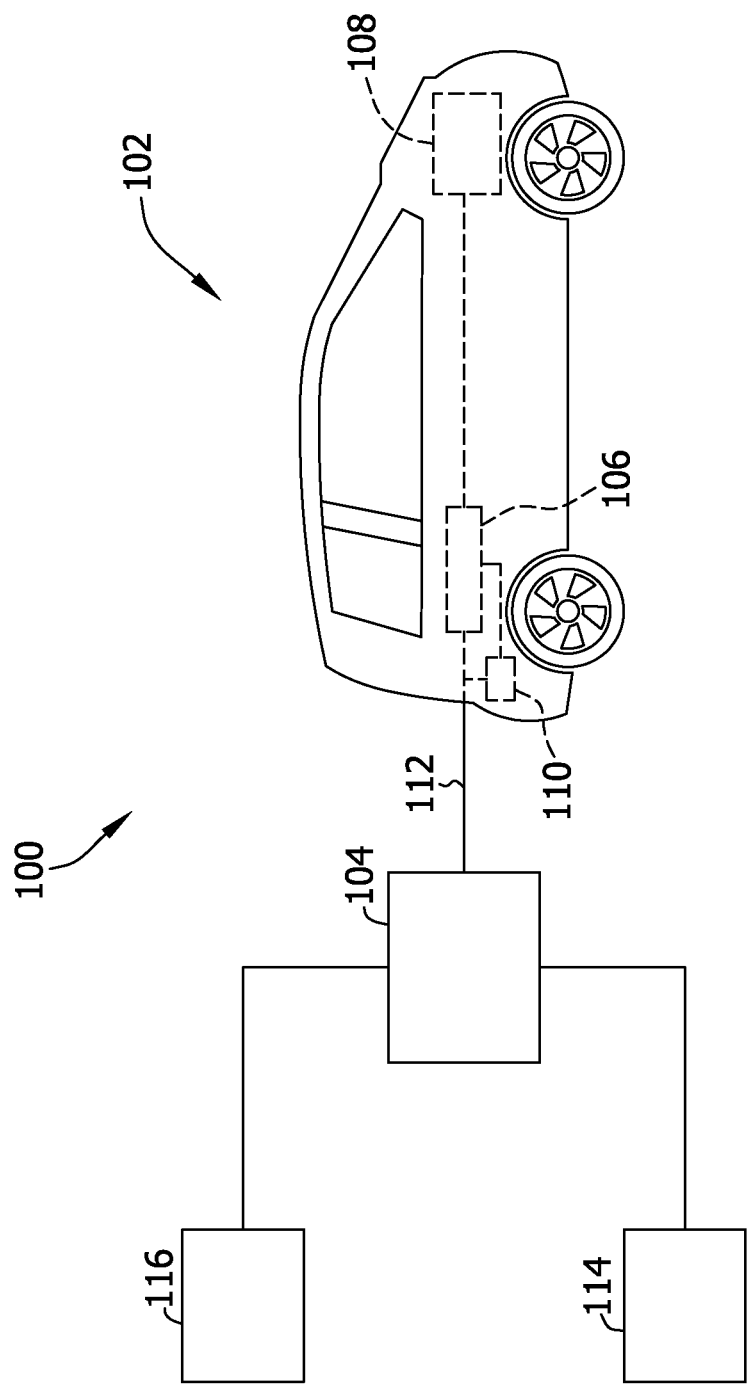
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. In an exemplary embodiment, electric vehicle 102 includes at least one power storage device 106, such as a battery and/or any other storage device, coupled to a motor 108. Moreover, in an exemplary embodiment, electric vehicle 102 includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In an exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. Moreover, in an exemplary embodiment, charging device 104 is coupled to an electric power source 114, such as a power grid of an electric utility company, a generator, a battery, and/or any other device or system that provides electricity to charging device 104.

In an exemplary embodiment, charging device 104 is coupled to at least one server 116 through a network, such as the Internet, a local area network (LAN), a wide area network (WAN), and/or any other network or data connection that enables charging device 104 to function as described herein. Server 116, in an exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

In an exemplary embodiment, server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, in an exemplary embodiment, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112. Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Moreover, charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
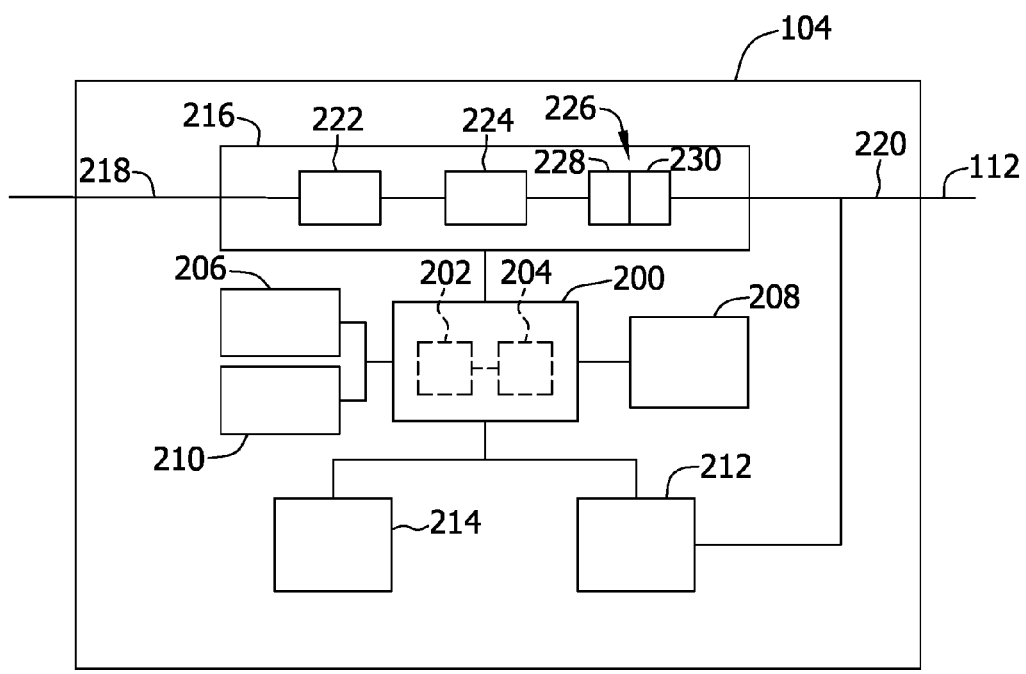
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface 210, to a vehicle communication module 212, to a temperature sensor 214, and to a current control module 216. Moreover, as described more fully herein, controller 200 controls and/or adjusts the current flowing through power conduit 112 if a temperature within charging device 104 exceeds a predetermined temperature threshold and/or if the current flowing through power conduit 112 exceeds a predetermined current threshold.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 204 includes a computer readable medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system, such as server 116 (shown in FIG. 1). In an exemplary embodiment, network interface 206 communicates with server 116 and controller 200 using any suitable communication protocol, such as a wired and/or a wireless Ethernet protocol.

In an exemplary embodiment, display 208 may include a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In an exemplary embodiment, a charging status of power storage device 106 (shown in FIG. 1), payment information, user authentication information, and/or any other information may be displayed to a user on display 208.

User interface 210 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into charging device 104 and/or to retrieve data from charging device 104. In an exemplary embodiment, the user may input user authentication information and/or payment information using user interface 210. Moreover, the user may operate user interface 210 to initiate and/or terminate the delivery of power to power storage device 106.

In an exemplary embodiment, vehicle communication module 212 is coupled to vehicle controller 110 (shown in FIG. 1) by power conduit 112 or by any other conduit that enables vehicle communication module 212 to function as described herein. Vehicle communication module 212 transmits data to, and receives data from, vehicle controller 110 using a suitable protocol, such as power line communication (PLC), a serial communication protocol, and/or any other protocol that enables vehicle communication module 212 to function as described herein. In an exemplary embodiment, vehicle communication module 212 transmits at least one signal (hereinafter referred to as a "current control signal") to vehicle controller 110 for use in controlling and/or adjusting an amount of current that power storage device 106 draws from charging device 104. More specifically, controller 200 determines an amount of current for power storage device 106 to draw from charging device 104. Controller 200 transmits one or more signals representative of the determined amount of current to vehicle communication module 212. In one embodiment, vehicle communication module 212 uses pulse width modulation and/or adjusts a duty cycle of the current control signal to notify vehicle controller 110 of the determined amount of current to draw from charging device 104. Alternatively, vehicle communication module 212 may use any other signal or signaling method to notify vehicle controller 110 of the determined amount of current to draw from charging device 104. The current control signal received from vehicle communication module 212 triggers vehicle controller 110 to draw the determined amount of current from charging device 104.

In an exemplary embodiment, temperature sensor 214 is positioned within charging device 104 and is coupled to controller 200. Alternatively, temperature sensor 214 is integrated within controller 200, within any other component of charging device 104, and/or is positioned in any other location that enables temperature sensor 214 to function as described herein. In an exemplary embodiment, temperature sensor 214 detects and/or measures the temperature within charging device 104. Temperature sensor 214 provides a signal representative of the measured and/or detected temperature (hereinafter referred to as a "temperature measurement") to controller 200.

In an exemplary embodiment, current control module 216 is coupled to an input end 218 of a power conduit 112 and to an output end 220 of power conduit 112. Input end 218 is coupled to a power source, such as electric power source 114 (shown in FIG. 1), and output end 220 is coupled to a load, such as power storage device 106. More specifically, in an exemplary embodiment, input end 218 is coupled to a single phase of a three phase alternating current (AC) power source, such as electric power source 114. Alternatively, input end 218 may be coupled to a direct current (DC) power source or to two or three phases of an AC power source. Moreover, in an exemplary embodiment, current control module 216 includes at least one current protection device 222, at least one secondary protection device 224, and at least one current sensor 226. Current protection device 222, in an exemplary embodiment, is activated to electrically isolate input end 218 from output end 220 if the current flowing through power conduit 112 exceeds a predetermined threshold or current limit. More specifically, current protection device 222 activates, or "trips," when the current flowing through power conduit 112 exceeds a rated current limit of current protection device 222. When current protection device 222 activates or trips, current is prevented from flowing through power conduit 112 (i.e., input end 218 is electrically isolated from output end 220). In an exemplary embodiment, current protection device 222 is a circuit breaker. Alternatively, current protection device 222 may be a fuse, a relay, and/or any other device that enables current protection device 222 to function as described herein.

Secondary protection device 224, in an exemplary embodiment, is a contactor 224 coupled to current protection device 222 by power conduit 112. Moreover, contactor 224 is coupled to, and is controlled by, controller 200. In an exemplary embodiment, controller 200 operates contactor 224 to interrupt the current flowing through power conduit 112 if the current exceeds a predetermined threshold, as more fully described herein, such that input end 218 is electrically isolated from output end 220. As such, by operating or activating contactor 224, controller 200 prevents current from flowing to power storage device 106. Moreover, contactor 224 is operated to interrupt the current flowing through power conduit 112 before current protection device 222 is activated such that current protection device 222 may be preserved as a backup protection device. Contactor 224 may be reset by controller 200 after contactor 224 has been activated such that input end 218 is electrically reconnected to output end 220. As such, the use of contactor 224 may reduce the number of maintenance visits required to restore power delivery from charging device 104 after excessive current has been transmitted through charging device 104.

At least one current sensor 226 measures and/or detects the current transmitted through power conduit 112 during operation of charging device 104. In an exemplary embodiment, a plurality of current sensors 226 include at least one current transformer 228 that detects one or more ground faults and at least one current transformer 230 that detects and/or measures the current transmitted through power conduit 112. Current sensors 226 transmit signals representative of the measured and/or detected current (hereinafter referred to as "current measurements") to controller 200.

Figure 3:
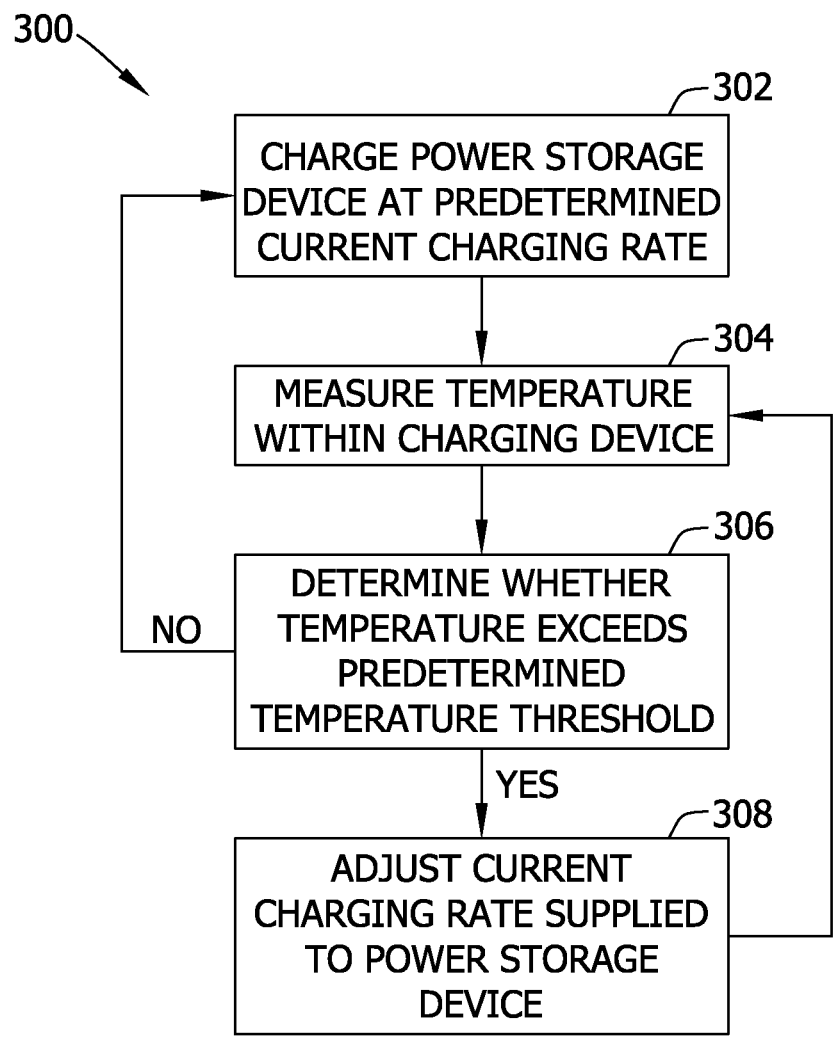
FIG. 3 is a flow diagram of an exemplary method for controlling a charging device that may be used with the charging device shown in FIG. 2.

FIG. 3 is a flow diagram of an exemplary method 300 for controlling a charging device, such as charging device 104 (shown in FIG. 2). In an exemplary embodiment, method 300 includes a plurality of instructions stored within memory device 204, and is at least partially executed by processor 202 (both shown in FIG. 2).

Charging device 104 is electrically coupled to an electric vehicle, such as electric vehicle 102, by power conduit 112 (both shown in FIG. 1). More specifically, charging device 104 is coupled to power storage device 106 (shown in FIG. 1) of electric vehicle 102 by power conduit 112. Power storage device 106 is charged 302 at a predetermined current rate or amplitude (hereinafter referred to as a "current charging rate") based on a current capacity or rating of power storage device 106 and/or a current capacity or rating of one or more components of current control module 216 (shown in FIG. 2). For example, if current protection device 222 is rated at 16 Amps (A), and no other component coupled to power conduit 112 has a lower current rating, charging device 104 supplies a predetermined current charging rate of approximately 16 A to power storage device 106. Alternatively, power storage device 106 is charged 302 with any other current rate that enables method 300 to function as described herein. A temperature within charging device 104 is measured 304, for example, by temperature sensor 214 (shown in FIG. 2). Controller 200 determines 306 whether the temperature within charging device 104 exceeds a predetermined temperature threshold. In an exemplary embodiment, the predetermined temperature threshold is selected such that the current rating of current protection device 222, contactor 224, and/or any other component of current control module 216 is maintained. In one embodiment, the predetermined temperature threshold is about 30 degrees Centigrade. Alternatively, the predetermined temperature threshold is any other temperature that enables method 300 to function as described herein.

If the determined temperature does not exceed the temperature threshold, method 300 continues charging 302 power storage device 106 at the predetermined current charging rate. If, however, the determined temperature exceeds the temperature threshold, method 300 adjusts 308 the current charging rate to a second current charging rate such that power storage device 106 is charged, or supplied with current, at the second current charging rate. In an exemplary embodiment, the second current charging rate is based on the determined temperature within charging device 104. In one embodiment, as the determined temperature progressively increases above the temperature threshold, the second current charging rate progressively decreases below the predetermined current charging rate. Alternatively, the second charging rate may have any linear or nonlinear relationship to the determined temperature such that the second current charging rate decreases at a linear or nonlinear rate as the determined temperature increases above the temperature threshold.

In one embodiment, the second current charging rate decreases in accordance with a degradation of the current rating, or a derating curve, of current protection device 222 as the determined temperature progressively increases above the temperature threshold. Moreover, in a further embodiment, controller 200 references and/or interpolates values received from a lookup table or other current rating or derating reference to determine the reduction in the second current charging rate at the determined temperature. The lookup table or other reference may be stored in memory device 204 and/or within any other device that enables the second current charging rate to be determined. Accordingly, by decreasing the charging current rate as the temperature increases within charging device 104, method 300 enables current protection device 222 to avoid being activated by excessive current. As such, method 300 may reduce a number of maintenance events that may otherwise be required to reset current protection device 222 as the temperature within charging device 104 increases.

Figure 4:
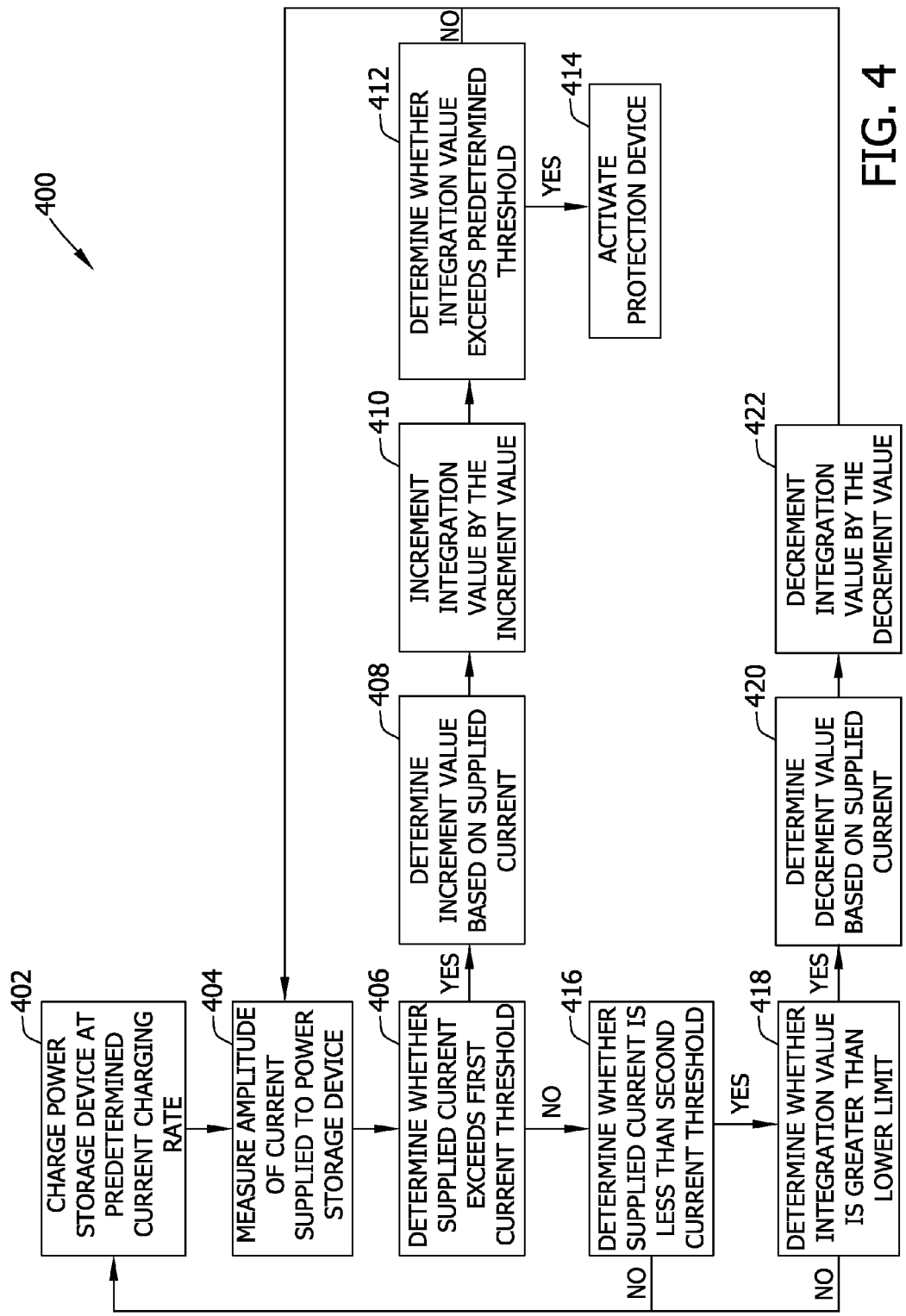
FIG. 4 is a flow diagram of another exemplary method for controlling a charging device that may be used with the charging device shown in FIG. 2.

FIG. 4 is a flow diagram of another exemplary method 400 for controlling a charging device, such as charging device 104 (shown in FIG. 2). In an exemplary embodiment, method 400 includes a plurality of instructions stored within memory device 204, and is at least partially executed by processor 202 (both shown in FIG. 2). Moreover, in an exemplary embodiment, method 300 (shown in FIG. 3) is used together with method 400.

In an exemplary embodiment, charging device 104 is electrically coupled to an electric vehicle, such as electric vehicle 102, by power conduit 112 (both shown in FIG. 1). More specifically, charging device 104 is coupled to power storage device 106 (shown in FIG. 1) of electric vehicle 102 by power conduit 112. Power storage device 106 is charged 402 at a predetermined current rate or amplitude (hereinafter referred to as a "current charging rate") based on a current capacity or rating of power storage device 106 and/or a current capacity or rating of one or more components of current control module 216 (shown in FIG. 2) in a similar manner as described above with reference to FIG. 3. As such, charging device 104 supplies the predetermined current charging rate to power storage device 106.

An amplitude of the current supplied to power storage device 106 is measured 404 by current sensor 226 (shown in FIG. 2) and/or by any other current sensor. Controller 200 determines 406 whether the amplitude of the measured current exceeds a predetermined first current threshold. In an exemplary embodiment, the first current threshold is approximately 1.25 times the rated current of current protection device 222. Alternatively, the first current threshold may be 1.13 times the rated current, or any other rate or level that enables method 400 to function as described herein.

The measured current may exceed the first current threshold, for example, when a component within electric vehicle 102, such as power storage device 106, is drawing excessive current due to a fault within electric vehicle 102 or due to any other abnormal state of electric vehicle 102 and/or charging device 104. If the measured current exceeds the first current threshold, an increment value is determined 408 based on the measured current. In an exemplary embodiment, the increment value is determined 408 or selected based on an amount that the amplitude of the measured current exceeds the first current threshold. In one embodiment, the increment value is exponentially proportional to the measured current. Alternatively, the increment value has any other relationship to the measured current that enables method 400 to function as described herein. The increment value may be selected by referencing and/or interpolating values received from a lookup table stored within memory device 204, and/or from any other data source that enables method 400 to function as described herein.

In an exemplary embodiment, an integration value is incremented 410 by the increment value, and controller 200 determines 412 whether the integration value exceeds a predetermined integration threshold. In an exemplary embodiment, the integration value, the increment values, and the integration threshold are stored within memory device 204 and/or within processor 202 (shown in FIG. 2). The integration value represents an amount of current that has accumulated above the first current threshold over a period of time. As used herein, the terms "accumulate" and "accumulation" refer to an aggregation of values, such as values representative of a current amplitude, that are measured by a sensor, such as current sensor 226 (shown in FIG. 2). In one embodiment, processor 202 receives periodic current measurements from current sensor 226 and increments 410 the integration value by an amount (i.e., the increment value) representative of the amplitude of each current measurement in excess of the first current threshold. The integration threshold represents a predetermined maximum accumulation of current over a predetermined period of time that may be sustained, or that is enabled to flow through power conduit 112, for example, without substantial damage to components of electric vehicle 102 and/or charging device 104. If the integration value exceeds the integration threshold, processor 202 activates 414 a current protection device, such as contactor 224. More specifically, processor 202 opens contactor 224 to electrically isolate input end 218 from output end 220 of power conduit 112 (all shown in FIG. 2). In one embodiment, processor 202 may reset contactor 224 (e.g., by closing contactor 224) to electrically couple input end 218 and output end 220 if power storage device 106 is decoupled from power conduit 112 and/or if the faulty condition is corrected or removed.

The integration value, in an exemplary embodiment, is initialized to zero at a beginning of charging device 104 operation, and is adjusted based on the increment value. Alternatively, the integration value may be initialized to any other value that enables method 400 to function as described herein. Moreover, in an exemplary embodiment, the increment values and the integration threshold are selected such that contactor 224 is activated before current protection device 222 is activated.

In an embodiment, contactor 224 is activated 414 when the supplied current exceeds the first current threshold for a predetermined amount of time, such as the amount of time it takes for the integration value to increase about the first current threshold. Preferably, the predetermined amount of time varies based on the amplitude of the supplied current. In an embodiment, as the amplitude of the supplied current progressively increases above the first current threshold, the amount of time that elapses before contactor 224 is activated 414 progressively decreases (i.e., increment values are progressively increased such that the integration value reaches the integration threshold more rapidly).

If, however, the integration threshold is not exceeded by the integration value, the current supplied to power storage device 106 is measured 404 and controller 200 determines 406 whether the measured current exceeds the first current threshold, as described above. If the measured current does not exceed the first current threshold, controller 200 determines 416 whether the measured current is less than a second current threshold. In an exemplary embodiment, the second current threshold is lower than the first current threshold. More specifically, in an exemplary embodiment, the second current threshold is approximately equal to the rated current of current protection device 222. Alternatively, the second current threshold may be any other rate or level that enables method 400 to function as described herein. If the measured current is greater than or equal to the second current threshold (but not greater than the first current threshold), no adjustment is made to the integration value (i.e., the integration value is maintained at its current value), and method 400 returns to measuring 404 the supplied current. If, however, the measured current is less than the second current threshold, controller 200 determines 418 whether the integration value is greater than zero or any other lower limit for the integration value. If the integration value is less than or equal to the lower limit, the amplitude of the current supplied to power storage device 106 is measured 404 as described above. If the integration value is greater than the lower limit, a decrement value is determined 420, and the integration value is decremented 422 by the decrement value. In one embodiment, the integration value is not decremented 422 below the lower limit. Method 400 returns to measuring 404 the supplied current.

In an exemplary embodiment, the decrement value is determined 420 based on the amplitude of the measured current. In one embodiment, the decrement value is exponentially proportional to the measured current. Alternatively, the decrement value has any other relationship to the measured current that enables method 400 to function as described herein. The decrement value may be selected by referencing and/or interpolating values received from a lookup table, and/or by any other data source that enables method 400 to function as described herein.

As described herein, a robust and effective charging device is provided. The charging device includes a current protection device and a secondary protection device. The current protection device electrically isolates an input end of a power conduit from an output end of the power conduit if the current channeled through the power conduit exceeds a current limit of the current protection device. The secondary protection device controls the current transmitted through the power conduit if the current exceeds a predetermined threshold and/or if the temperature within the charging device exceeds a predetermined threshold. A controller within the charging device may reset the secondary protection device to restore current flow through the power conduit. As such, a maintenance technician may not be needed to be physically present at the charging device to reset the current protection device if excessive current has been transmitted through the power conduit. Moreover, current protection device and secondary protection device may protect components within the charging device and/or components within the electric vehicle from damage resulting from excessive current.

A technical effect of the device and methods described herein includes at least one of (a) supplying current to a power storage device of an electric vehicle using a charging device; (b) measuring at least one of a temperature within a charging device and a current flowing through the charging device; and (c) adjusting a current supplied to a power storage device of an electric vehicle based on at least one of a measured temperature and a measured current.

Exemplary embodiments of a charging device and methods of controlling a charging device are described above in detail. The charging device and methods are not limited to the specific embodiments described herein, but rather, components of the charging device and/or steps of the methods may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging device for use with an electric vehicle including a power storage device, said charging device comprising:

a power conduit configured to electrically couple the power storage device to said charging device;

a first protection device configured to electrically isolate said charging device from the power storage device if a current flowing through said power conduit exceeds a current limit; and a controller configured to control the current flowing through said power conduit if a temperature within said charging device exceeds a predetermined threshold, wherein said controller is further configured to transmit, when the temperature exceeds the predetermined threshold, a signal from said charging device to the electric vehicle that causes the electric vehicle to adjust a current drawn from said charging device by the power storage device, wherein said charging device is external to and separate from the electric vehicle.

2. A charging device in accordance with claim 1, wherein said controller is configured to cause the current flowing through said power conduit to be reduced as the temperature increases above the predetermined threshold.

3. A charging device in accordance with claim 1, wherein the electric vehicle includes a vehicle controller, and wherein said controller of said charging device is configured to transmit the signal to the vehicle controller.

4. A method of controlling a charging device, said method comprising:
supplying current to a power storage device of an electric vehicle using the charging device;
measuring a temperature within the charging device; and
adjusting the current supplied to the power storage device based on the measured temperature by transmitting, when the measured temperature exceeds a predetermined threshold, a signal from the charging device to the electric vehicle that causes the electric vehicle to adjust a current drawn from the charging device by the power storage device, wherein the charging device is external to and separate from the electric vehicle.

5. A method in accordance with claim 4, wherein said adjusting the current supplied to the power storage device comprises adjusting the current supplied to the power storage device if the measured temperature exceeds a temperature threshold.

6. A method in accordance with claim 5, wherein said adjusting the current supplied to the power storage device comprises reducing the current supplied to the power storage device as the temperature increases above the temperature threshold.

7. A method in accordance with claim 4, wherein the electric vehicle includes a vehicle controller, and wherein said adjusting the current supplied to the power storage device comprises transmitting the signal to the vehicle controller.

8. A method in accordance with claim 4, further comprising:
measuring a current flowing through the charging device; and
preventing the current from flowing to the power storage device if the measured current causes an integration threshold to be exceeded, wherein the integration threshold is representative of a predetermined amount of current that is enabled to flow to the power storage device over a predetermined period of time.

9. A method in accordance with claim 4, further comprising:
measuring a current flowing through the charging device; and
activating a protection device using a controller if the measured current causes an integration threshold to be exceeded, wherein the integration threshold is representative of a predetermined amount of current that is enabled to flow to the power storage device over a predetermined period of time.

10. A method in accordance with claim 9, further comprising determining whether the measured current exceeds a first current threshold before the protection device is activated.

11. A method in accordance with claim 10, further comprising:
determining whether the measured current is less than a second current threshold if the measured current does not exceed the first current threshold; and
decrementing the integration value if the measured current is less than the second current threshold.

12. A method in accordance with claim 9, further comprising:
determining an increment value based on the measured current; and
incrementing an integration value by the increment value.

13. A method in accordance with claim 12, wherein said activating a protection device using a controller if the measured current causes the integration threshold to be exceeded comprises activating a protection device using a controller if the integration value exceeds the integration threshold.

14. A system for use in charging a power storage device of an electric vehicle using current received from an electric power source, said system comprising:
a charging device comprising:
a power conduit configured to receive current from the electric power source and to provide the current to the power storage device;
a first protection device configured to electrically isolate said charging device from the power storage device if a current flowing through said power conduit exceeds a current limit; and
a controller configured to control the current flowing through said power conduit based on a measured temperature within said charging device by transmitting, when the measured temperature exceeds a predetermined threshold, a first signal from said charging device to the electric vehicle that causes the electric vehicle to adjust a current drawn from said charging device by the power storage device, wherein said charging device is external to and separate from the electric vehicle.

15. A system in accordance with claim 14, wherein said charging device is configured to be coupled to a server, the server configured to transmit a second signal to said charging device to enable said charging device to charge the power storage device.

16. A system in accordance with claim 14, wherein said controller is configured to cause the current flowing through said power conduit to be reduced as the measured temperature increases above the predetermined threshold.

17. A system in accordance with claim 16, wherein the electric vehicle includes a vehicle controller, and wherein said controller of said charging device is configured to transmit the first signal to the vehicle controller.

18. A system in accordance with claim 14, wherein said charging device further comprises a second protection device, and wherein said controller is configured to control the current flowing through said power conduit by activating said second protection device.

19. A system in accordance with claim 18, wherein said controller is configured to activate said second protection device to prevent current from flowing through said power conduit.

20. A system in accordance with claim 18, wherein said controller is configured to activate said second protection device if the current flowing through said power conduit exceeds an integration threshold, wherein the integration threshold is representative of a predetermined amount of current that is enabled to flow through said power conduit over a predetermined period of time.

* * * * *